United States Patent [19]

Pinettes et al.

[11] 4,129,771

[45] Dec. 12, 1978

[54] METHOD FOR BUTT-WELDING CYLINDRICAL METALLIC RODS

[75] Inventors: Jacques Pinettes, Gieres; Jean Chaix, Claix, both of France

[73] Assignee: Alliages Frittes S.A., Paris, France

[21] Appl. No.: 795,641

[22] Filed: May 10, 1977

[30] Foreign Application Priority Data

May 31, 1976 [FR] France .................................. 76 17172

[51] Int. Cl.² .............................................. B23K 9/02
[52] U.S. Cl. ........................... 219/104; 219/121 EM; 219/121 LM; 219/159; 219/137 R
[58] Field of Search ................ 219/121 EM, 121 LM, 219/60 A, 100, 104, 159, 137 R, 59.1, 10.57, 61; 228/196, 242

[56] References Cited

U.S. PATENT DOCUMENTS

| 3,255,336 | 6/1966 | Purcell | 219/159 X |
| 3,472,996 | 10/1969 | Braid | 219/104 |
| 3,937,716 | 2/1976 | Sciaky | 219/60 R |
| 4,054,771 | 10/1977 | Foulquier | 219/59.1 |

*Primary Examiner*—E. A. Goldberg
*Attorney, Agent, or Firm*—Dennison, Dennison, Meserole & Pollack

[57] ABSTRACT

The disclosure relates to a method and a device for butt-welding rotational cylindrical metallic rods without filler metal and without forming a rim or deformation in the welded area. The method consists of bringing the two ends coaxially to be welded into contact proximity without compression and applying welding power while simultaneously rotating the two rods in relation to the welding heat source around their common rotational axis to an extent of more than one complete revolution.

10 Claims, 1 Drawing Figure

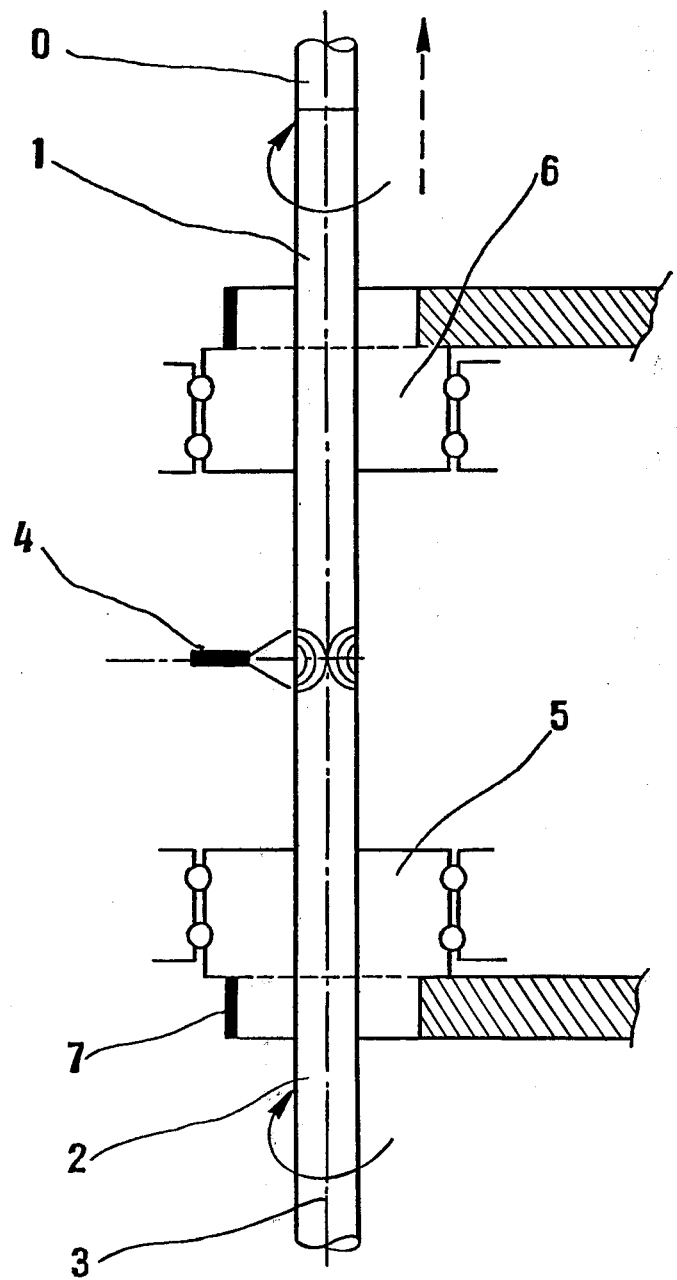

METHOD FOR BUTT-WELDING CYLINDRICAL METALLIC RODS

The present invention relates to a method for butt-welding cylindrical metallic rods without filler metal which prevents a rim from forming in the welded area and a deformation from being formed between the joined rods. This method is particularly intended for butt-welding rods made from hard facing alloys.

Rods which are made from hard facing alloys are made of iron, nickel or cobalt-based alloys, generally containing carbon or boron and having a low hot elongation and are therefore practically nonforgeable.

These cylindrical rods having diameters of between 2 and 15 mm and usually being less than 1000 mm long, are usually produced by discontinuous casting and consequently are not constant in length. Users, particularly those having automatic deposition machines (for example valve and tap manufactures) would like to have rods which are as long as possible so as to reduce the inevitable wastage caused by the butts and even to eliminate wastage completely by joining the rods in situ, that is directly on the deposition machine.

Furthermore, the devices which supply the rods to these deposition machines do not allow for rims. On the other hand, some users require rods of constant length, for example, in the case of coating electrodes, by extrusion or simply for considerations of presentation.

For these two reasons, recourse is therefore made to butt-welding rods of varying length by cutting the continuous bar formed in this way to a given length, if necessary.

The methods usually applied for welding rods, such as resistance or flash welding, gas blow-pipe welding or friction welding, all comprise a heating phase and a forging phase, during which the two preheated ends are crushed one against the other so as to guarantee the weld, that is, the continuity of the solid state.

This deformation by compression always causes a rim to appear, which is not acceptable in the case of hard facing rods. In fact, this rim is jagged and exhibits cracks caused by its poor suitability to hot deformation, making the quality of the weld questionable. Furthermore, the devices for supplying deposition machines and extrusion dies for coating electrodes do not allow for the presence of this rim. It is therefore necessary to eliminate this rim by milling it or by correcting the whole of the rod on a "centerless" machine causing a considerable increase in the manufacturing cost and a loss of material, preventing in situ joining on automatic deposition machines.

In addition, the various methods mentioned produce deformations at the joints when the cuts are not perfectly orthogonal. In fact, the power supply for welding does not usually have rotational symmetry and since the alloy is a very poor conductor of heat (about 30 times poorer than copper) during the cooling treatment which may last several minutes, the hotter side contracts more and causes a deformation in the joined section. Now at this moment, the rod is no longer gripped between the jaws except to the extent of allowing a ridiculously low rate of welding and nothing opposes the deformation.

The invention sets out to resolve these disadvantages since it allows cylindrical rods to be welded without a rim being formed, thus eliminating the necessity for rectification later on and without there being any risk of residual deformation at the level of the weld. At the same time, it provides for high rates of welding and very easy automation owing in particular to the elimination of the forging phase. Furthermore, the composition of the rod is not altered and the mechanical properties of the welded area are very similar to those of the rod itself.

The method according to the invention for butt-welding revolving cylindrical metallic rods of equal diameter without filler metal and without forming a rim in the welded area nor a deformation, consists in placing one of the two ends to be welded in contact with the other end without compressive stress and in activating the two contacting rods with one relative movement of rotation around their common rotational axis in relation to the welding energy source making more than one complete revolution, while the energy required for welding is supplied and during at least part of the cooling treatment.

The energy required for welding is provided by a concentrated source which may be primed, placed level with the plane of contact of the two ends to be welded. This source may be a TIG (tungsten inert gas) arc, a plasma arc, a high frequency loop, an electron gun for forming a weld by electronic bombardment, a laser gun or any other source of concentrated energy which affords fusion within the rod. For hard facing alloys, the TIG arc is sufficient for cylindrical rods having a diameter of the order of 4 mm. On the other hand, for rods having a diameter of 8 mm, it may be necessary to use a plasma arc and for a diameter of 12 mm to use electronic bombardment.

In order to obtain the relative movement of two rods to be joined in relation to the welding power supply, the supply may either be kept stationary while the rods are rotated around their common rotational axis, or, on the other hand, the rods may be kept stationary while power supply is rotated around the rotational axis of the rods. The latter solution is required in the case of, for example, joining in situ on automatic deposition machines (consolidation of valves, taps, etc.) which make it difficult to rotate the rod itself.

In the first case, each of the two rods to be welded is gripped concentrically in the coaxial rotating tongs actuated by a same rotational movement without there being the least compression of the longitudinal direction.

The rotational movement of the rotating tongs may be continuous, it being essential that the rotational movement of two rods to be welded is more than one complete revolution for a given weld.

In the second case, where the power supply rotates around the rods, because of the wires supplying the current, the rotation must take place alternately in one direction and then in the other, provided that there is more than one complete revolution for each weld.

Since there is a relative movement of the rods under the heat supply in both cases, a liquid ring is gradually formed in the heated area and this ring expands until it attains the entire cross-section of the rods. Owing to the relative rotation, this ring maintains a circular shape, does not fall and does not assume a drop shape because it is held in place by the surface tension of the liquid.

It is therefore sufficient to reduce the power supply in strength when the liquid phase reaches the axis, that is after a predetermined period for a given material and to allow it to solidify while at the same time maintaining rotation for a certain period.

Insofar as the rods make more than one rotation in relation to the heat supply, the rotational symmetry is kept for the entire duration of the operation. Two or three revolutions are usually sufficient to produce an excellent result. With regard to the angular velocity of the relative rotational movement, this must be greater, the better conductor the material to be welded is.

The rotational symmetry of the welded area being maintained, there is no risk of deformation appearing between the two joined sections and the tongs can thus be released after a few seconds.

Finally, it is noted that no rim is formed. On the other hand, a slight hollow corresponding to the volume left empty by a cut which might have been slightly skew or by a slight space between the ends before welding may appear.

The invention also relates to a device for implementing the method and this device is illustrated diagramatically by the single FIGURE.

The cylindrical rods 1 and 2 are placed so that one of their ends is in contact in an orthogonal section in relation to their common rotational axis 3. The power supply for welding, for example, a TIG arc 4 is placed in the vicinity of the rods in a plane which is defined by the cross-section of contact.

Each of the rods is gripped by a merely radial stress in tongs 5 and 6, these two identical tongs being coaxially rotatable around the axis 3 and being adapted to grip or release the rods 1 and 2 at will. These tongs are permanently actuated by a same uniform rotational movement around the axis 3 both in the gripping and releasing condition. In the case of the TIG arc or the plasma arc, the tongs 5 and 6 are each provided with a rotating electric connection 7 which may be, for example, a stranded copper, in such a way that the electrical resistances of the current return circuits of each tong are identical, in order to prevent a break in the electric circuit and to prevent the arc from settling preferentially on one side to be welded rather than on the other.

The welding operation takes place in the following manner: it is assumed that a rod 0 has already been joined to the rod 1 in an earlier operation. Once the tongs 5 and 6 are released, the rod 1 is pushed longitudinally along the axis 3 until its unwelded end is situated opposite the supply 4. The tongs 6 are then closed and, by means of another longitudinal thrust, a rod 2 is butted against the end of the rod 1 which is maintained stationary during travel by the tongs 6. The tongs 5 are then closed and the plane of joining is positioned on the right-hand side of the supply 4, the two rods rotating at the same angular velocity and in the same direction. The arc is then primed for a sufficient period for the molten area to reach the axis. The arc is then gradually extinguished and once the structure has rotated several times, the tongs are released and the rods 1 and 2 which have been welded in this way are pushed to form the corresponding weld, on the right-hand side of the unwelded end of the rod 2. The operations of moving the rods forward, priming and extinguishing the arc may easily be automated by a suitable control system.

The method according to the invention may be illustrated by the two following examples which describe particular, nonlimitative embodiments:

EXAMPLE 1

Cylindrical rods of 4 mm diameter and of the following composition (in % by weight) C = 1; W = 4.5; Cr = 26; Si = 1; Co = 67.5 are joined under the following conditions:
rotational velocity of the rods: 150 rpm
power supply: TIG arc — 30 v — 50 A
period of maintenance of the arc of 3 seconds comprising a rapid increase in intensity (>1s) and a gradual lowering in 2s.

The joining machine operates in an automatic cycle at the effective rate of 5 welds per minute, including the cooling and transfer periods.

The rods obtained do not exhibit deformations or rims.

EXAMPLE 2

The cylindrical rods of 8 mm diameter and of the following compositions (% by weight) C = 2.5; W = 13; Cr = 33; Si = 1; Co = 50.5 are joined in the following conditions.
preliminary spacing of 0.3 mm
rotational velocity: 300 r.p.m.
power supply: plasma arc — 30 v — 125 A
period of maintenance of arc of 6 seconds comprising an almost instantaneous rise in intensity, maintenance at 125 A for 3 seconds and at 40 A for 3 seconds. The rods obtained are straight and do not exhibit a rim. When subjected to the breaking test by bending between two simple supports, the break takes place outside the welding plane.

We claim:

1. The method of butt welding hard facid metallic rods of substantially the same diameter without filler metal and without radial deformation in the welded area comprising the steps of bringing the ends of two adjacent coaxial rods having a common axis into contact with each other without compressive stress, welding said rod ends together by a heat source sufficient to accomplish said weld, while simultaneously rotating the rods about their common axis with respect to said heat source for at least more than one complete revolution at controlled a speed whereby the welded area forms with the unwelded area of the rods a substantially smooth surface and a rimless joint is formed between the ends of said coaxial rods.

2. The method defined by claim 1 in which said rods consist of nonforgeable metallic alloy.

3. The method defined by claim 2 in which the metallic alloy is a cobalt-based hard facing alloy.

4. The method defined by claim 1 in which the heat source is a welding torch.

5. The method defined by claim 4 in which the welding torch is a tungsten inert gas arc.

6. The method defined by claim 4 in which the welding torch is a plasma arc.

7. The method defined by claim 4 in which the welding torch is a high frequency loop.

8. The method defined by claim 4 in which the welding torch is an electron gun.

9. The method defined by claim 4 in which the welding torch is a laser gun.

10. The method according to claim 1 wherein the rotational velocity and the degree of revolution is sufficient to form a rotational liquid ring in the welded area and expanding said ring until it attains uniform cross-section with the rods.

* * * * *

UNITED STATES PATENT AND TRADEMARK OFFICE
CERTIFICATE OF CORRECTION

PATENT NO. : 4,129,771
DATED : December 12, 1978
INVENTOR(S) : Jacques Pinettes and Jean Chaix It is certified that error appears in the above—identified patent and that said Letters Patent are hereby corrected as shown below:

Claim 1, line 1, "facid" should be "faced".

Signed and Sealed this

Twenty-seventh Day of March 1979

[SEAL]

Attest:

RUTH C. MASON
Attesting Officer

DONALD W. BANNER
Commissioner of Patents and Trademarks